United States Patent
Hyun et al.

(10) Patent No.: US 12,462,744 B2
(45) Date of Patent: Nov. 4, 2025

(54) DISPLAY PANEL AND DISPLAY DEVICE HAVING THE SAME

(71) Applicant: Samsung Display Co., LTD., Yongin-si (KR)

(72) Inventors: Chang Ho Hyun, Yongin-si (KR); Joonhee Song, Yongin-si (KR); Ji Hye Eom, Yongin-si (KR); Seungwon Chegal, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/212,296

(22) Filed: Jun. 21, 2023

(65) Prior Publication Data

US 2024/0105117 A1    Mar. 28, 2024

(30) Foreign Application Priority Data

Sep. 23, 2022  (KR) .................. 10-2022-0120840

(51) Int. Cl.
  *G09G 3/20*    (2006.01)
  *G09G 3/3225*  (2016.01)
  *H10K 59/131*  (2023.01)

(52) U.S. Cl.
  CPC .............. *G09G 3/3225* (2013.01); *G09G 3/20* (2013.01); *G09G 3/2085* (2013.01); *G09G 2300/0426* (2013.01); *G09G 2310/0202* (2013.01); *G09G 2310/08* (2013.01); *H10K 59/131* (2023.02)

(58) Field of Classification Search
  CPC ...... G09G 3/20; G09G 3/2085; G09G 3/3225; G09G 3/3233; G09G 3/3266; G09G 3/3275; G09G 2300/0426; G09G 2310/0202; G09G 2310/08; G09G 2320/0233; H10K 59/131

See application file for complete search history.

(56) References Cited

U.S. PATENT DOCUMENTS 9,857,651 B2 *  1/2018  Zeng ................. G02F 1/133514
9,905,152 B2 *  2/2018  Sang .................... G09G 3/3607
10,451,942 B2 * 10/2019  Yu ..................... G02F 1/136286
(Continued)

FOREIGN PATENT DOCUMENTS

CN    116229900 A  *  6/2023
KR    100444496 B1     8/2004
(Continued)

*Primary Examiner* — Julie Anne Watko
(74) *Attorney, Agent, or Firm* — CANTOR COLBURN LLP

(57) ABSTRACT

A display panel of a display device includes a display region divided into a first display region and a second display region, pixels disposed in the display region, gate lines each connected to some pixels, a first data line connected to some pixels in the first display region, and a second data line connected to some pixels in the second display region, the first data line is connected to N pixels among the pixels of each of pixel rows in the first display region, where N is a positive integer greater than or equal to 2, the second data line is connected to all of the pixels in a same pixel column in the second display region, the second data line is connected to only one of the pixels in a same pixel row in the second region, and the N pixels are connected to different gate lines, respectively.

18 Claims, 17 Drawing Sheets

(56) References Cited

U.S. PATENT DOCUMENTS

| | | | | |
|---|---|---|---|---|
| 2010/0110114 A1* | 5/2010 | Hashimoto | .......... | G09G 3/3614 |
| | | | | 345/88 |
| 2010/0156945 A1* | 6/2010 | Yoshida | ............... | G09G 3/3648 |
| | | | | 345/84 |
| 2011/0017994 A1* | 1/2011 | Kuo | ..................... | G09G 3/3659 |
| | | | | 257/E27.111 |
| 2012/0307174 A1* | 12/2012 | Lee | ..................... | G09G 3/3614 |
| | | | | 349/54 |
| 2015/0029080 A1* | 1/2015 | Kwon | ............... | G02F 1/136286 |
| | | | | 345/90 |
| 2017/0192562 A1* | 7/2017 | Zhou | ..................... | G06F 3/0412 |
| 2018/0033383 A1* | 2/2018 | Kim | ..................... | G09G 3/3607 |
| 2019/0066590 A1* | 2/2019 | Li | ........................ | G09G 3/3233 |
| 2019/0219878 A1* | 7/2019 | Hao | ..................... | G02F 1/1368 |

FOREIGN PATENT DOCUMENTS

| | | | |
|---|---|---|---|
| KR | 1020180002430 A | | 1/2018 |
| KR | 1020190107261 A | | 9/2019 |
| KR | 102119192 B1 | | 6/2020 |
| KR | 102223494 B1 | | 3/2021 |
| KR | 1020170051674 A | | 5/2022 |

\* cited by examiner

P1:P11,P13,P15,
P17,P21,P23,P25,
P31,P33,P35,P41,
P43,P45,P51,P53,
P55,P61,P63

P2:P12,P14,P16,
P22,P24,P26,P32,
P34,P36,P42,P44,
P52,P54,P62,P64

P1: P11, P14, P17, P21, P24, P31, P34, P41, P44, P51, P54, P61, P64

P2: P12, P15, P22, P25, P32, P35, P42, P45, P52, P55, P62

P3: P13, P16, P23, P26, P33, P36, P43, P53, P63

P1:P11,P15,P21,P25,
P31,P35,P41,P45,P51,
P55,P61

P2:P12,P16,P22,P26,
P32,P36,P42,P52,P62

P3:P13,P17,P23,P33,P43,
P53,P63

P4:P14,P24,P34,P44,
P54,P64

DISPLAY PANEL AND DISPLAY DEVICE HAVING THE SAME

This application claims priority to Korean Patent Application No. 10-2022-0120840, filed on Sep. 23, 2022, and all the benefits accruing therefrom under 35 U.S.C. § 119, the content of which in its entirety is herein incorporated by reference.

BACKGROUND

1. Field

Embodiments of the invention relate to a display panel and a display device including the display panel. More particularly, embodiments of the invention relate to a display panel including a display region and a display device including the display panel.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The display panel may include a display region displaying an image and a peripheral region. Also, the display region may have various shapes. For example, the display region may have an atypical shape such as a rhombus, a trapezoid, etc., as well as a regular shape of a rectangle.

SUMMARY

In a display device including data lines extending in a vertical or horizontal direction, where a display region has an atypical shape (i.e., a shape in which the number of pixels varies according to a pixel row or column), the data lines may be formed in a part where the number of pixels decreases along the pixel row or column. Accordingly, in such a display device, dead space bay be substantially great.

Embodiments of the invention provide a display device in which at least two pixels in a same row are connected to a same data line.

Embodiments of the invention also provide a display device having a display panel.

According to embodiments of the invention, a display panel of a display device includes a display region divided into a first display region and a second display region, pixels disposed in the display region, gate lines connected to the pixels, a first data line connected to the pixels in the first display region, and a second data line connected to the pixels in the second display region, where the first data line is connected to N pixels among the pixels of each of pixel rows in the first display region, where N is a positive integer greater than or equal to 2, and the N pixels are connected to different gate lines, respectively.

In an embodiment, a number of the pixels of each of the pixel rows in the first display region may be not constant.

In an embodiment, a number of the pixels of each of the pixel rows in the second display region may be constant.

In an embodiment, at least one of the gate lines connected to the N pixels may be connected to the pixels disposed in the second display region.

In an embodiment, the first display region may be scanned with a first scan frequency, and the second display region may be scanned at a second scan frequency lower than the first scan frequency.

In an embodiment, the first scan frequency may be the N times the second scan frequency.

In an embodiment, the first data line may be connected to a first pixel and a second pixel among the pixels of each of the pixel rows in the first display region, the first pixel may be connected to a first gate line among the gate lines, and the second pixel may be connected to a second gate line among the gate lines.

In an embodiment, the pixels disposed in the second display region may be connected to the first gate line.

In an embodiment, a horizontal time of each frame may include a first scan period and a second scan period following the first scan period, the first pixel in the first display region and the pixels in the second display region may be scanned in the first scan period, and the second pixel in the first display region may be scanned in the second scan period.

In an embodiment, the second data line may be connected to one of the pixels of each of the pixel rows in the second display region.

According to embodiments of the invention, a display device includes a display panel including pixels disposed to a display region, a data driver which provides data voltages to a first data line and a second data line connected to the pixels, a gate driver which provides scan signals to gate lines connected to the pixels, and a timing controller which controls the data driver and the gate driver, where the display panel includes the display region divided into a first display region and a second display region, the gate lines connected to the pixels, the first data line connected to the pixels in the first display region, and the second data line connected to the pixels in the second display region, where the first data line is connected to N pixels among the pixels of each of pixel rows in the first display region, where N is a positive integer greater than or equal to 2, and the N pixels are connected to different gate lines, respectively.

In an embodiment, a number of the pixels of each of the pixel rows in the first display region may be not constant.

In an embodiment, a number of the pixels of each of the pixel rows in the second display region may be constant.

In an embodiment, at least one of the gate lines connected to the N pixels may be connected to the pixels disposed in the second display region.

In an embodiment, the first display region may be scanned with a first scan frequency, and the second display region may be scanned with a second scan frequency lower than the first scan frequency.

In an embodiment, the first scan frequency may be the N times the second scan frequency.

In an embodiment, the first data line may be connected to a first pixel and a second pixel among the pixels of each of the pixel rows in the first display region, the first pixel may be connected to a first gate line among the gate lines, and the second pixel may be connected to a second gate line among the gate lines.

In an embodiment, the pixels disposed in the second display region may be connected to the first gate line.

In an embodiment, a horizontal time of each frame may include a first scan period and a second scan period following the first scan period, the first pixel in the first display region and the pixels in the second display region may be scanned in the first scan period, and the second pixel in the first display region may be scanned in the second scan period.

In an embodiment, the second data line may be connected to one of the pixels of each of the pixel rows in the second display region.

In such embodiments, the display device may reduce dead space caused by a display region having an atypical shape by connecting the first data line to N pixels among pixels of each of pixel rows, and connecting the N pixels to different gate lines, respectively.

However, the features of embodiments of the invention are not limited to those described above, and may be variously modified without departing from the spirit and scope of the invention.

DETAILED DESCRIPTION

Figure 1:
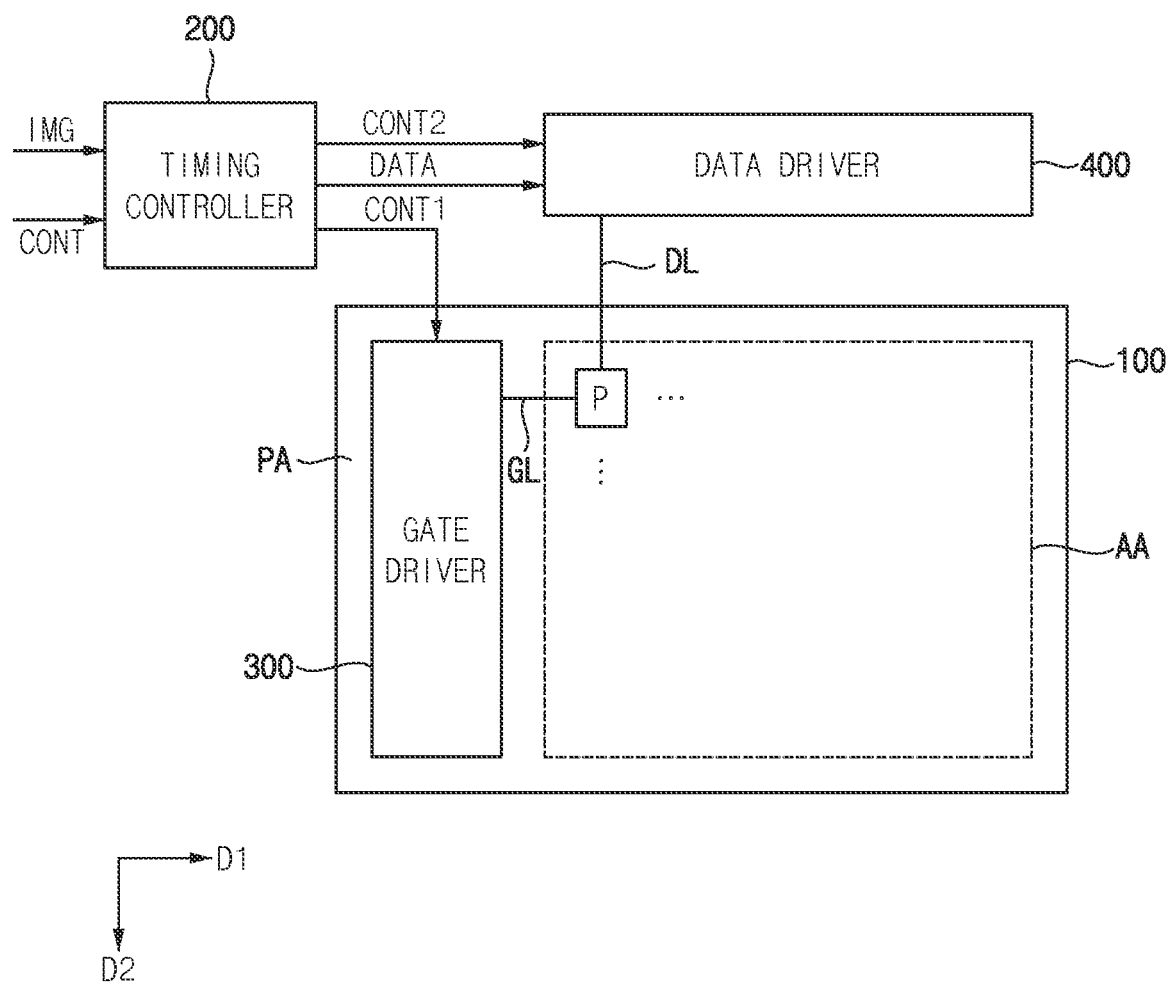
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device according to embodiments of the invention.

Referring to FIG. 1, an embodiment of the display device may include a display panel 100, a timing controller 200, a gate driver 300, and a data driver 400. In an embodiment, the timing controller 200 and the data driver 400 may be integrated into one chip, that is, defined by portions of a single chip, respectively.

The display panel 100 has a display region AA on which an image is displayed and a peripheral region PA adjacent to the display region AA. In an embodiment, the gate driver 300 may be mounted on the peripheral region PA of the display panel 100. Although the display region AA is shown in a rectangular shape in FIG. 1, this is only to schematically indicate the display region AA and does not indicate that the display region AA is rectangular.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit (GPU)). In an embodiment, for example, the input image data IMG may include red image data, green image data and blue image data. In an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals (e.g., scan signals) to the gate lines GL. In an embodiment, for example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

Figure 2:
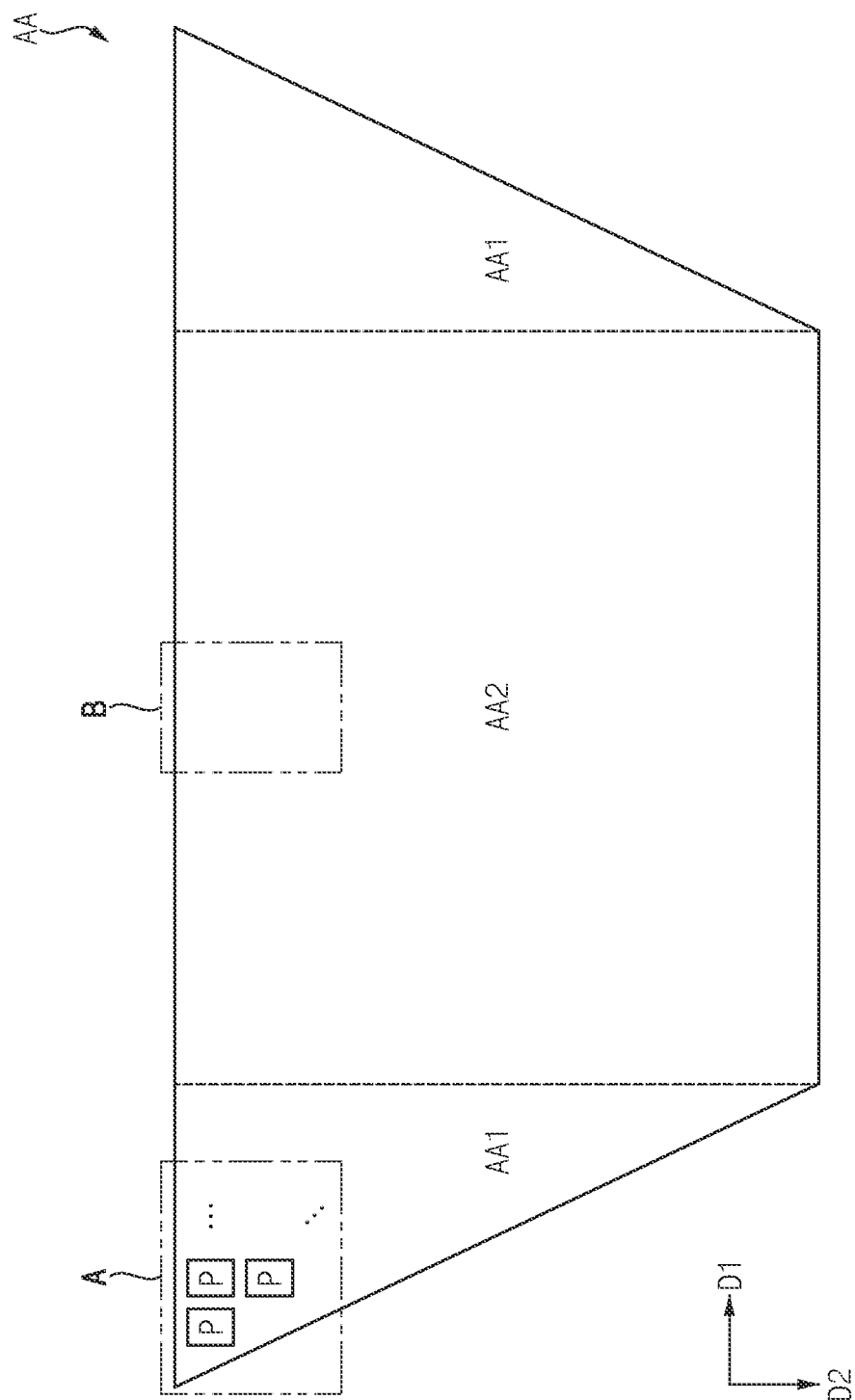
FIG. 2 is a diagram illustrating an example of a display region of the display device of FIG. 1.

FIG. 2 is a diagram illustrating an example of the display region AA of the display device of FIG. 1.

Referring to FIG. 2, the pixels P may be disposed to display region AA. The display region AA may have an atypical shape (i.e., a shape in which the number of the pixels P varies according to a pixel row or column). FIG. 2 shows an embodiment where the display device has a trapezoidal display region AA, but the invention is not limited thereto. In an alternative embodiment, for example, the display region AA may have another shape such as a triangle, a pentagon, a star, etc.

The display region AA may be divided into a first display region AA1 and a second display region AA2. The number of the pixels P of each of the pixel rows in the first display region AA1 may not be constant. The number of pixels P of each of the pixel rows in the second display region AA2 may be constant.

For example, the pixel row may be a set of the pixels P in the first direction D1. For example, the pixel column may be a set of the pixels P in the second direction D2.

Figure 3:
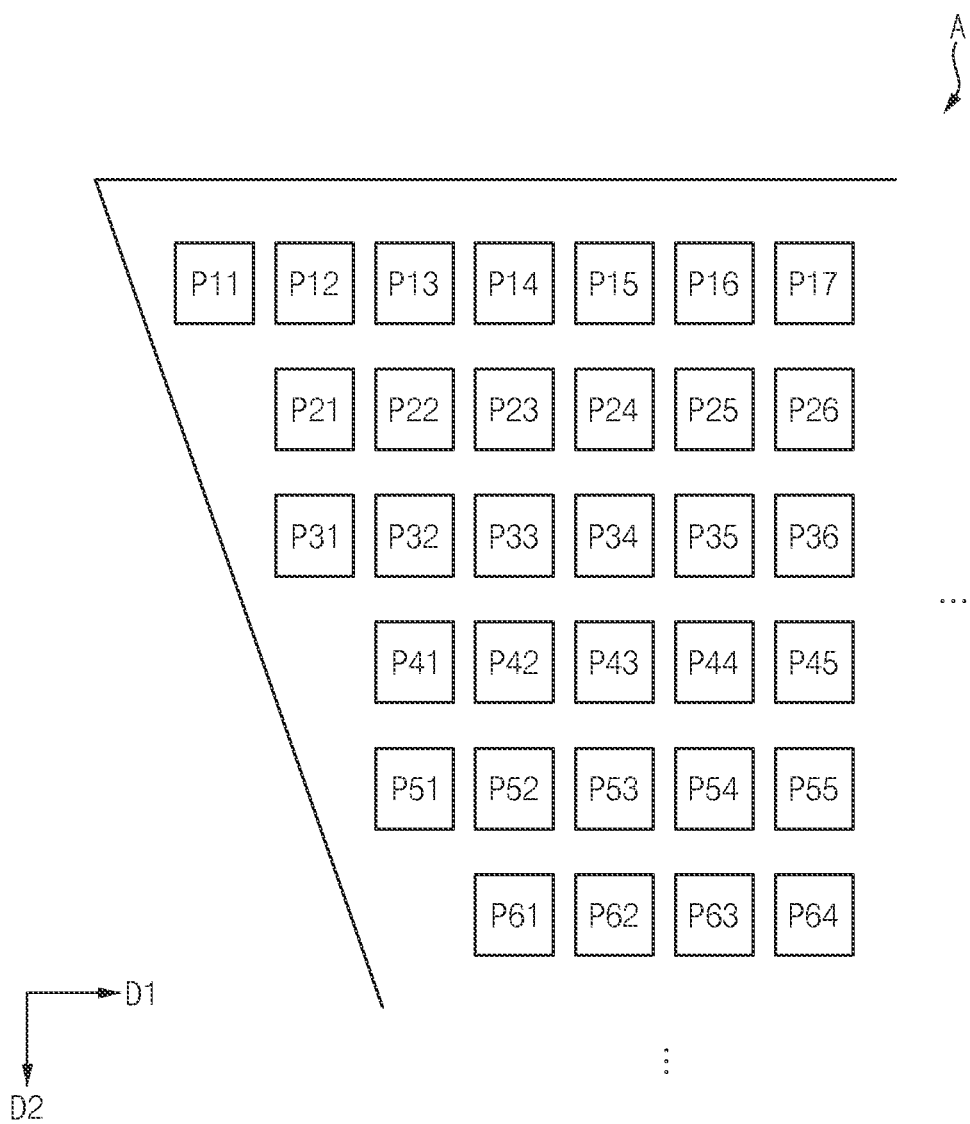
FIG. 3 is a diagram illustrating an example of region A of FIG. 2 of the display device of FIG. 1.
Figure 4:
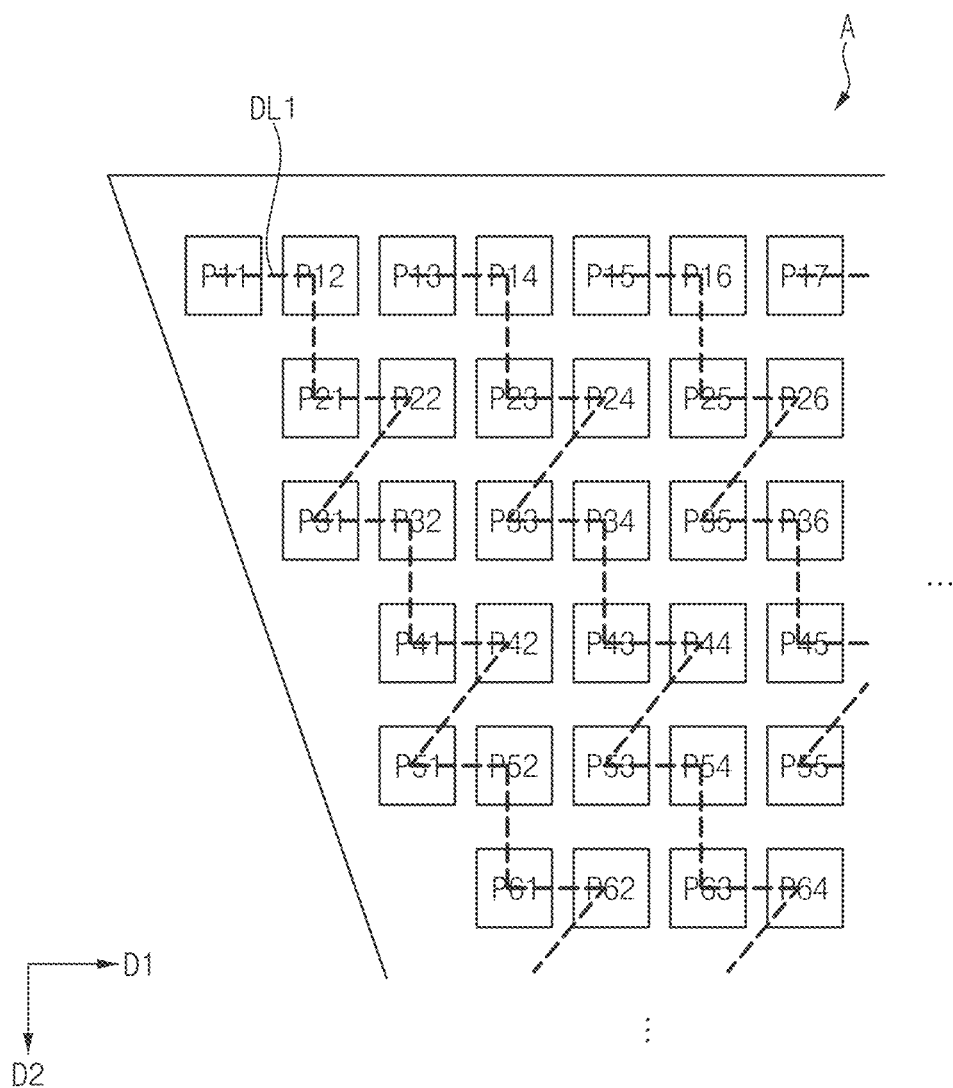
FIG. 4 is a diagram illustrating an example of a first data line of the display device of FIG. 1.
Figure 5:
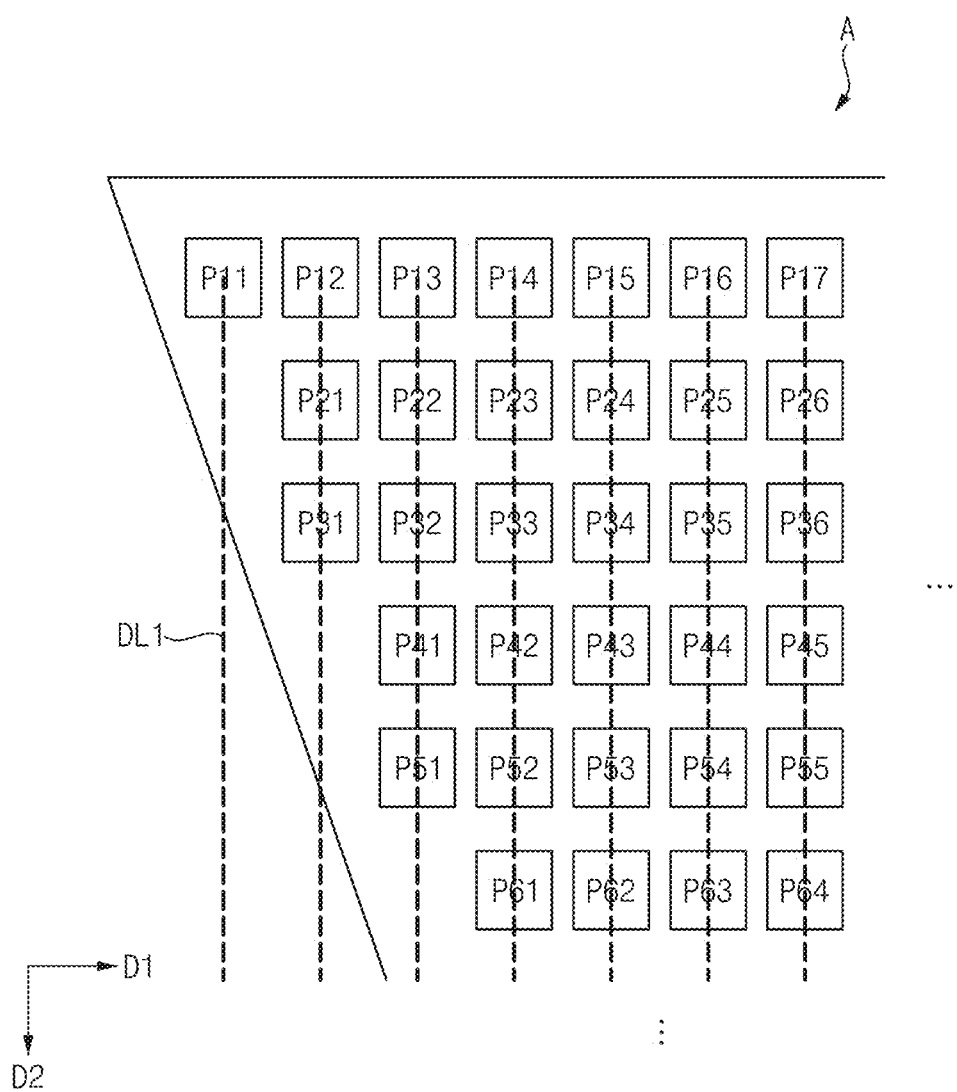
FIG. 5 is a diagram illustrating a comparative example of a first data line.

FIG. 3 is a diagram illustrating an example of region A of FIG. 2 of the display device of FIG. 1, FIG. 4 is a diagram illustrating an example of a first data line DL1 of the display device of FIG. 1, and FIG. 5 is a diagram illustrating a comparative example of the first data line DL1. FIGS. 4 and 5 do not show a portion where the first data line DL1 is connected to the data driver 400.

FIGS. 3 to 5 show a pixel P in an x row and a y column as Pxy. For example, the pixel P in a first row and a first column is P11, the pixel P in a second row and a first column is P21, and the pixel P in the first row and a second column is P12.

Referring to FIGS. 1 to 4, the display panel 100 may include the first data line DL1 connected to the pixels P of the first display region AA1. The first data line DL1 may be connected to N pixels P among the pixels P of each of the pixel rows, where N is a positive integer greater than or equal to 2.

In an embodiment, for example, as shown in FIG. 4, where N is 2, the first data line DL1 may be connected to a first pixel P1 and a second pixel P2 among the pixels P of each of the pixel rows. In such an embodiment, the first data line DL1 may be connected to the plurality of the pixels P (i.e., the first pixel P1 and the second pixel P2) in one pixel row.

In an embodiment, for example, as shown in FIG. 4, the first pixel P1 may be P11, P13, P15, P17, P21, P23, P25, P31, P33, P35, P41, P43, P45, P51, P53, P55, P61 and P63, and the second pixel P2 may be P12, P14, P16, P22, P24, P26, P32, P34, P36, P42, P44, P52, P54, P62, and P64.

In an embodiment, for example, a first of the first data lines DL1 may be connected to P11 and P12 in a first pixel row. In an embodiment, for example, the first of the first data lines DL1 may be connected to P21 and P22 in a second pixel row.

In an embodiment, for example, a second of the first data lines DL1 may be connected to P13 and P14 in the first pixel row. In an embodiment, for example, the second of the first data lines DL1 may be connected to P23 and P24 in the second pixel row.

Referring to FIGS. 2 to 5, FIG. 5 shows a comparative example where the first data lines DL1 extend in the second direction D2. As shown in FIG. 5, when the first data lines DL1 extend in a vertical or horizontal direction, dead space (i.e., a portion where the first data line DL1 is formed outside the display region AA) of the display panel 100 including the display region AA having an atypical shape may be increased.

Accordingly, in an embodiment of the invention, the display device of FIG. 1 may reduce the dead space by connecting the first data line DL1 to the N pixels P (i.e., the first pixel P1 and the second pixel P2) in one pixel row.

Figure 6:
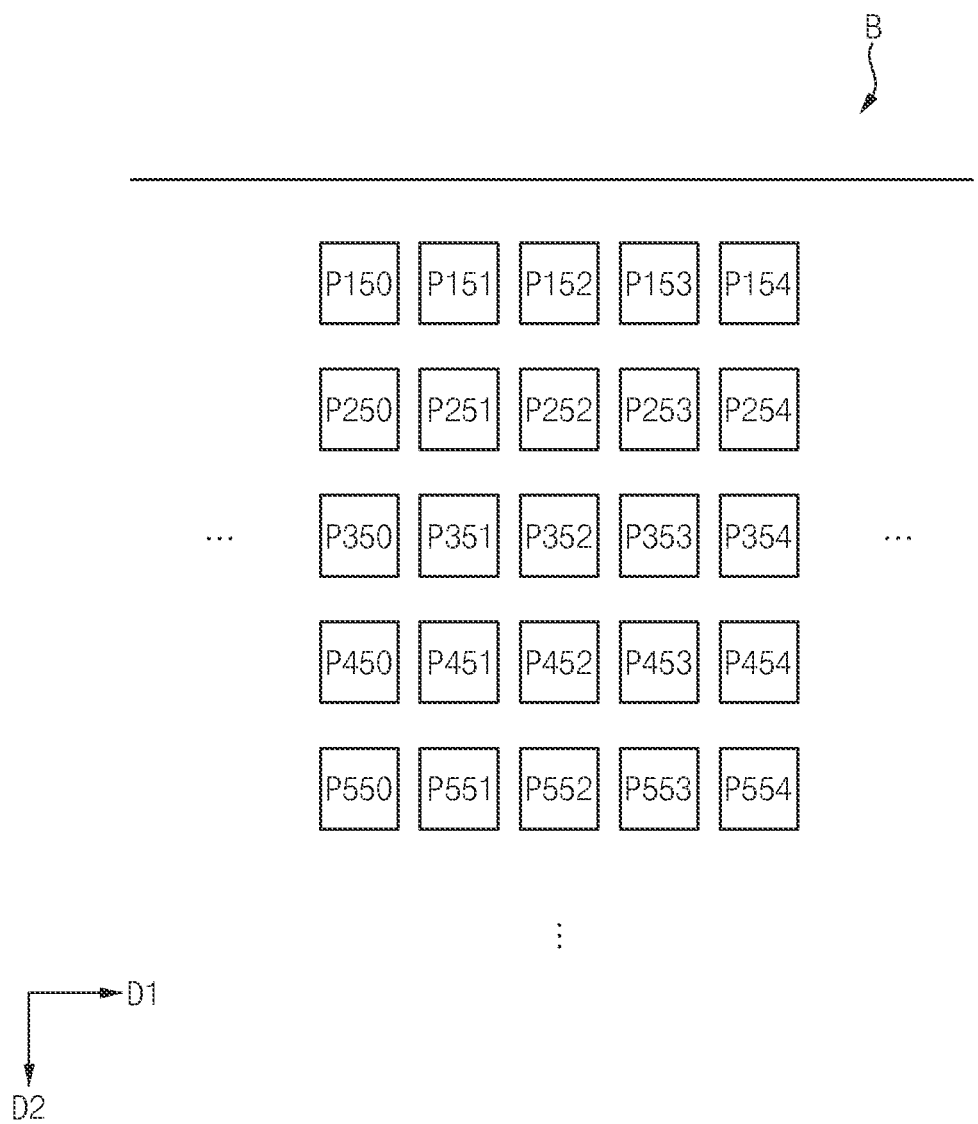
FIG. 6 is a diagram illustrating an example of region B of FIG. 2 of the display device of FIG. 1.
Figure 7:
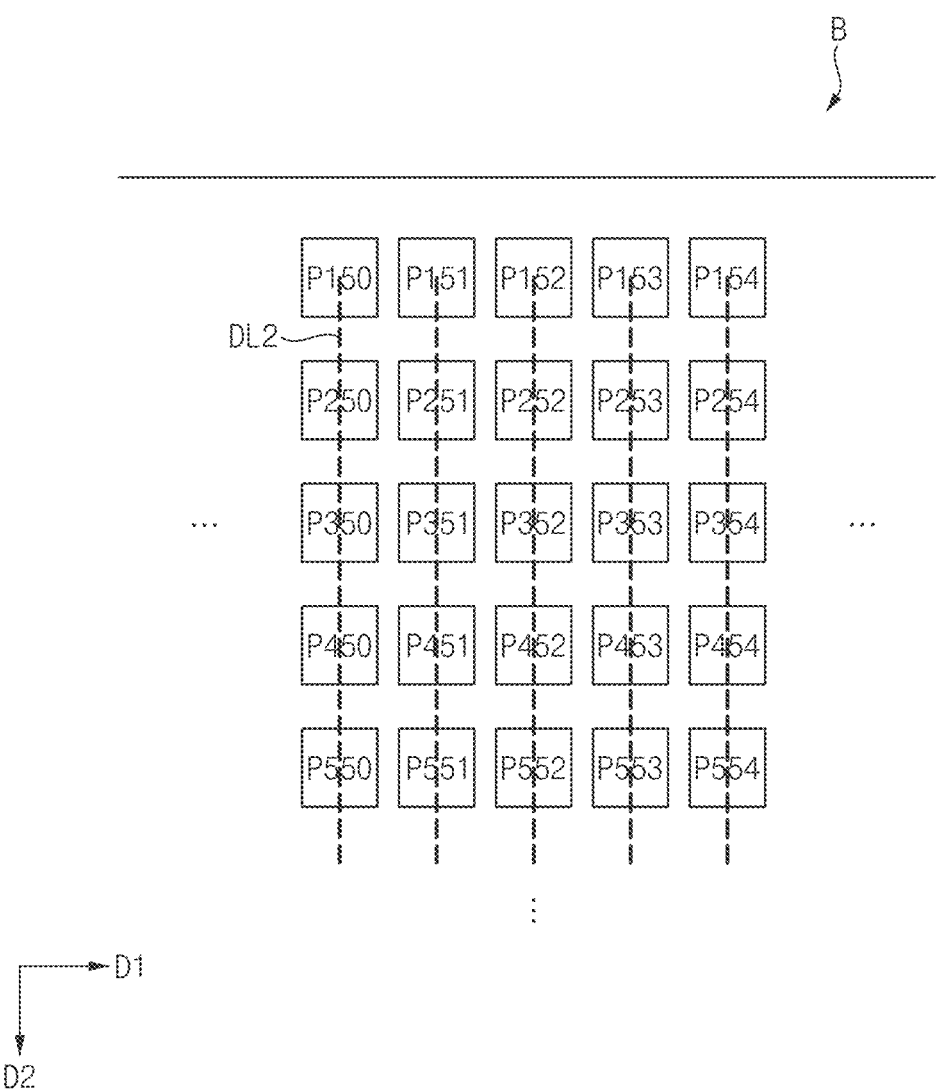
FIG. 7 is a diagram illustrating an example of a second data line of the display device of FIG. 1.

FIG. 6 is a diagram illustrating an example of region B of FIG. 2 of the display device of FIG. 1, and FIG. 7 is a diagram illustrating an example of a second data line DL2 of the display device of FIG. 1.

FIGS. 6 and 7 show a pixel P in an x row and a y column as Pxy. For example, the pixel P in the first row and a 50th column is P150, the pixel P in the second row and the 50th column is P250, and the pixel P in the first row and a 51st column is P151.

Referring to FIGS. 1, 2, 6, and 7, the display panel 100 may include the second data line DL2 connected to the pixels P of the second display region AA2. The second data line DL2 may be connected to one of the pixels P of each of the pixel rows. That is, since the number of the pixels P in each of the pixel rows in the second display region AA2 is constant, the second data line DL2 may extend vertically or horizontally.

For example, when the 50th pixel column is included in the second display region AA2, one of the second data lines DL2 may be connected to the pixels P (P150, P250, P350, P450, P550, ...) of the 50th pixel column. For example, when a 51st pixel column is included in the second display region AA2, one of the second data lines DL2 may be connected to the pixels P (P151, P251, P351, P451, P551, ...) of the 51st pixel column.

Figure 8:
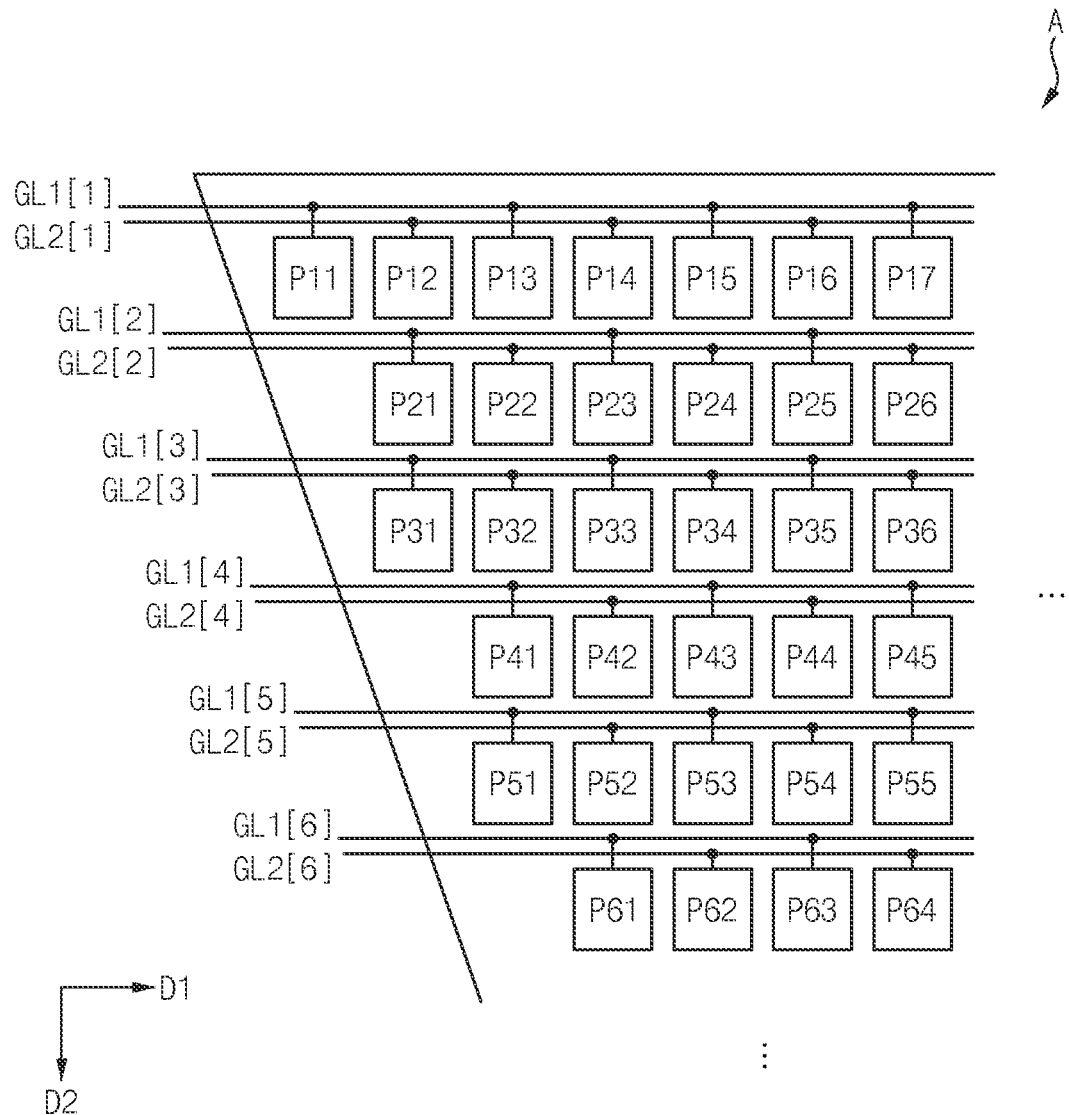
FIG. 8 is a diagram illustrating an example of gate lines in region A of FIG. 2 of the display device of FIG. 1.
Figure 9:
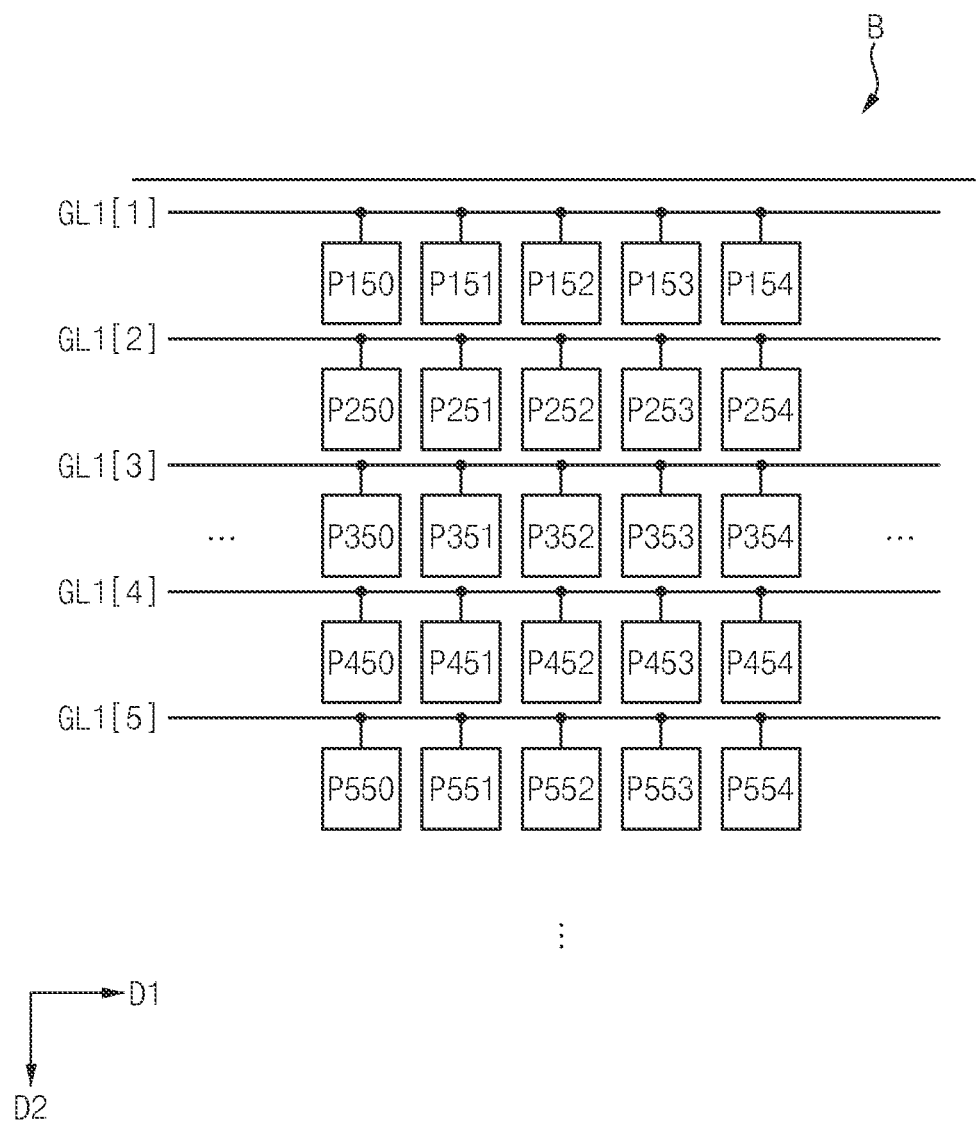
FIG. 9 is a diagram illustrating an example of gate lines in region B of FIG. 2 of the display device of FIG. 1.
Figure 10:
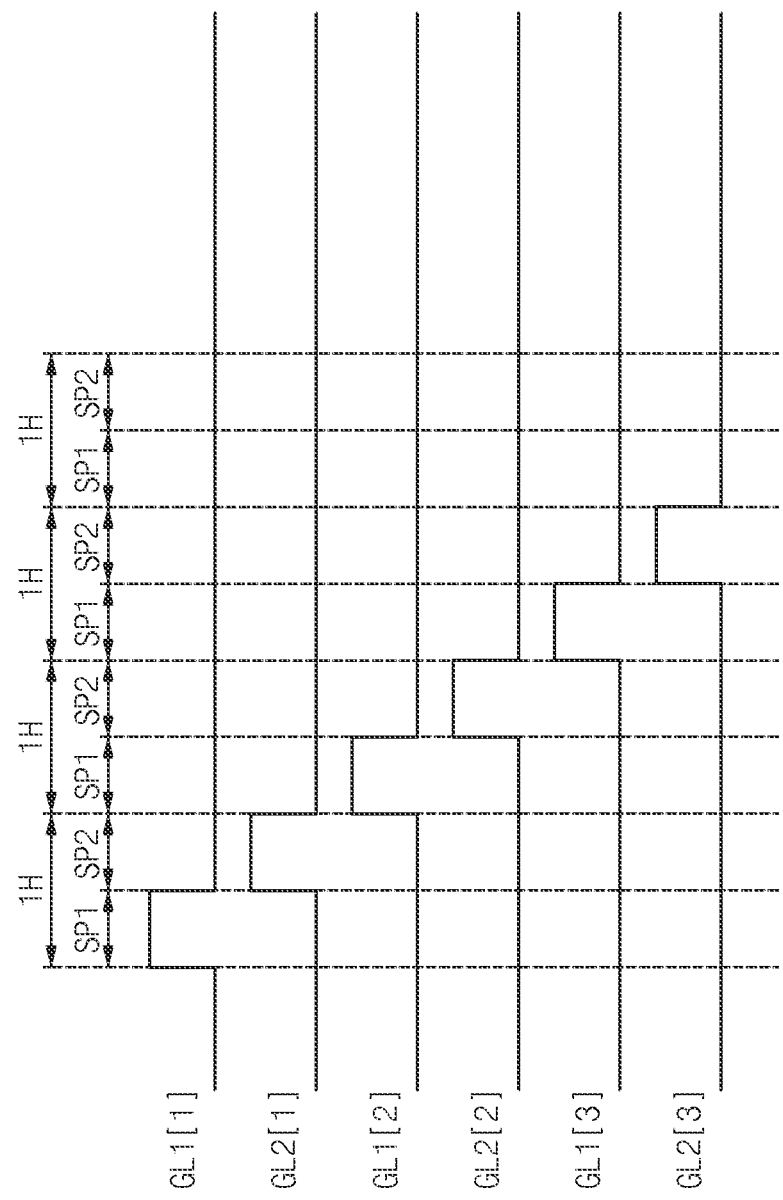
FIG. 10 is a timing diagram illustrating an example of a scan operation of the display device of FIG. 1.

FIG. 8 is a diagram illustrating an example of the gate lines GL in region A of FIG. 2 of the display device of FIG. 1, FIG. 9 is a diagram illustrating an example of the gate lines GL in region B of FIG. 2 of the display device of FIG. 1, and FIG. 10 is a timing diagram illustrating an example of a scan operation of the display device of FIG. 1.

Referring to FIGS. 1, 2, 4, and 7 to 9, the first data line DL1 may be connected to N pixels P among the pixels P of each of the pixel rows, and the N pixels P may be connected to different gate lines GL, respectively. One of the gate lines (for example, a first gate line (GL1[1], GL1[2], GL1[3], GL1[4], GL1[5], GL1[6], ... ) and a second gate line (GL2[1], GL2[2], GL2[3], GL2[4], GL2[5], GL2[6], ... )) connected to the N pixels P may be connected to the pixels P disposed to the second display region AA2

In an embodiment, for example, as shown in FIG. 4, where N is 2, the first data line DL1 may be connected to the first pixel P1 and the second pixel P2 among the pixels P of each of the pixel rows. In an embodiment, for example, as shown in FIG. 8, the first pixel P1 may be connected to the first gate line (GL1[1], GL1[2], GL1[3], GL1[4], GL1[5], GL1[6], ... ) among the gate lines GL, and the second pixel P2 may be connected to the second gate line (GL2[1], GL2[2], GL2[3], GL2[4], GL2[5], GL2[6], ... ) among the gate lines GL. For example, as shown in FIG. 9, the pixels P disposed to the second display region AA2 may be connected to the first gate line (GL1[1], GL1[2], GL1[3], GL1[4], GL1[5], GL1[6], ... ).

For example, in the first pixel row, P11, P13, P15, and P17 may be connected to a first GL1[1] among the first gate lines (GL1[1], GL1[2], GL1[3], GL1[4], GL1[5], GL1[6], ... ). For example, in the first pixel row, P150, P151, P152, P153, and P154 may be connected to the first GL1[1] among the first gate lines (GL1[1], GL1[2], GL1[3], GL1[4], GL1[5], GL1[6], ... ). For example, P12, P14, and P16 may be connected to the first GL2[1] among the second gate lines (GL2[1], GL2[2], GL2[3], GL2[4], GL2[5], GL2[6], ... ).

For example, in the second pixel row, P21, P23, and P25 may be connected to a second GL1[2] among the first gate lines (GL1[1], GL1[2], GL1[3], GL1[4], GL1[5], GL1[6], ... ). For example, in the second pixel row, P250, P251, P252, P253, and P254 may be connected to the second GL1[2] among the first gate lines (GL1[1], GL1[2], GL1[3], GL1[4], GL1[5], GL1[6], ... ). For example, P22, P24, and P26 may be connected to the second GL2[2] among the second gate lines (GL2[1], GL2[2], GL2[3], GL2[4], GL2[5], GL2[6], ... ).

Referring to FIGS. 1, 2, 4, and 7 to 10, FIG. 10 shows the scan signals provided to each of the gate lines GL. The gate driver 300 may provide the scan signals to the gate lines GL, and the data voltages may be written to the pixels P connected to the gate lines GL in response to the scan signal having a high voltage level. (i.e. the scan operation).

A horizontal time 1H of each frame may include a first scan period SP1 and a second scan period SP2 following the first scan period SP1, the first pixel P1 and the pixels P of the second display region AA2 may be scanned in the first scan period SP1, and the second pixel P2 may be scanned in the second scan period SP2.

Simultaneous scanning of the first pixel P1 and the second pixel P2 connected to one first data line DL1 may be difficult. Accordingly, in an embodiment, the first pixel P1 and the second pixel P2 may be connected to different gate lines GL, respectively.

For example, the scan signal may be provided to the first gate line (GL1[1], GL1[2], GL1[3], GL1[4], GL1[5], GL1[6]) in the first scan period SP1, and the scan signal may be provided to the second gate line (GL2[1], GL2[2], GL2[3], GL2[4], GL2[5], GL2[6], ... ) in the second scan period SP2. For example, the scan signals may be sequentially provided to the first gate lines (GL1[1], GL1[2], GL1[3], GL1[4], GL1[5], GL1[6]) in the first scan period SP1, and the scan signals may be sequentially provided to the second gate lines (GL2[1], GL2[2], GL2[3], GL2[4], GL2[5], GL2[6], ... ) in the second scan period SP2.

Accordingly, since the first gate lines (GL1[1], GL1[2], GL1[3], GL1[4], GL1[5], GL1[6], ... ) may be connected to the first pixels P1 and the pixels P disposed to the second display region AA2, the first pixels P1 and the pixels P disposed to the second display region AA2 may be scanned in the first scan period SP1. For example, since the second gate line (GL2[1], GL2[2], GL2[3], GL2[4], GL2[5], GL2[6], ... ) may be connected to the second pixels P2, the second pixels P2 may be scanned in the second scan period SP2.

The first display region AA1 may be scanned with a first scan frequency, and the second display region AA2 may be scanned with a second scan frequency lower than the first scan frequency. In an embodiment, the first scan frequency may be N times the second scan frequency.

In an embodiment, for example, since the pixels P disposed to the first display region AA1 are connected to the first gate lines GL1 and the second gate lines GL2, the first display region AA1 may be scanned in both the first scan period SP1 and the second scan period SP2. In such an embodiment, since the pixels P disposed to the second display region AA2 are connected only to the first gate lines GL1, the second display region AA2 may be scanned in the first scan period SP1. Accordingly, in an embodiment where N is 2, the first scan frequency may be twice the second scan frequency.

Figure 11:
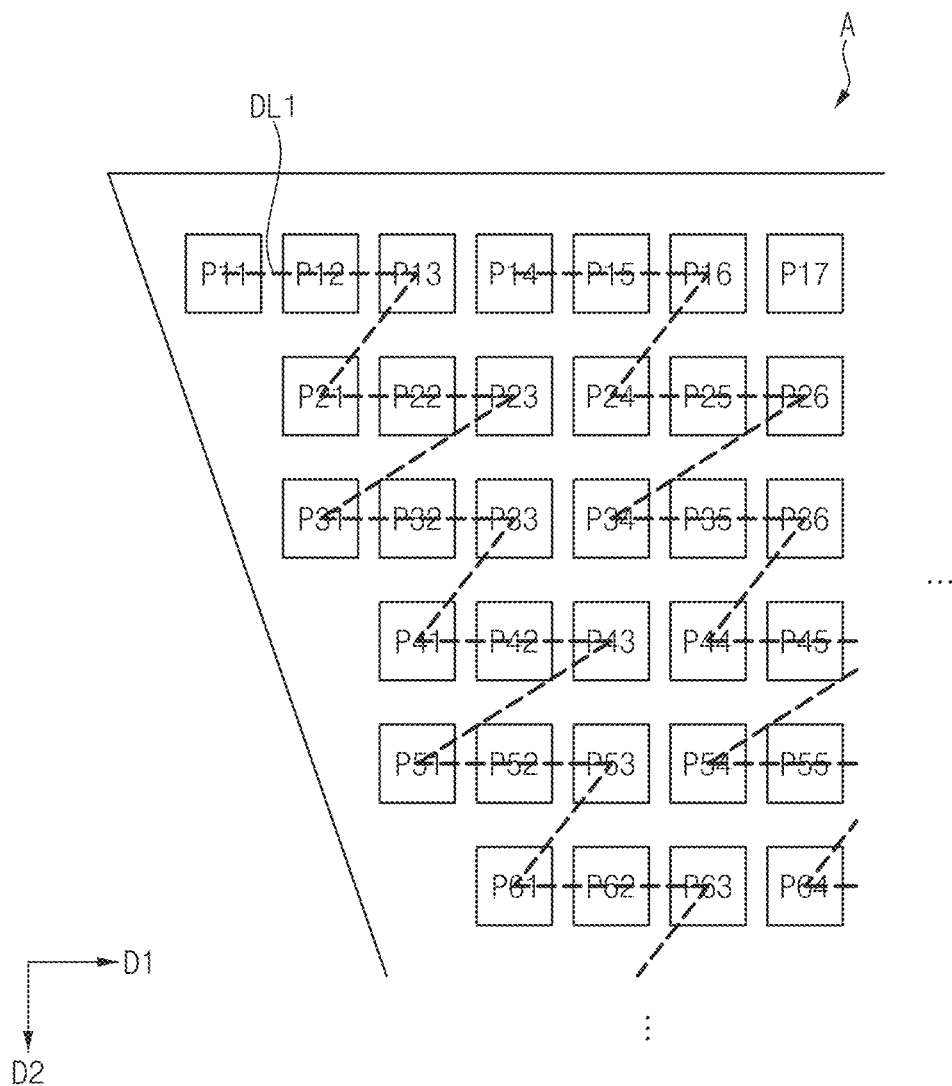
FIG. 11 is a diagram illustrating an example of a first data line of a display device according to embodiments of the invention.
Figure 12:
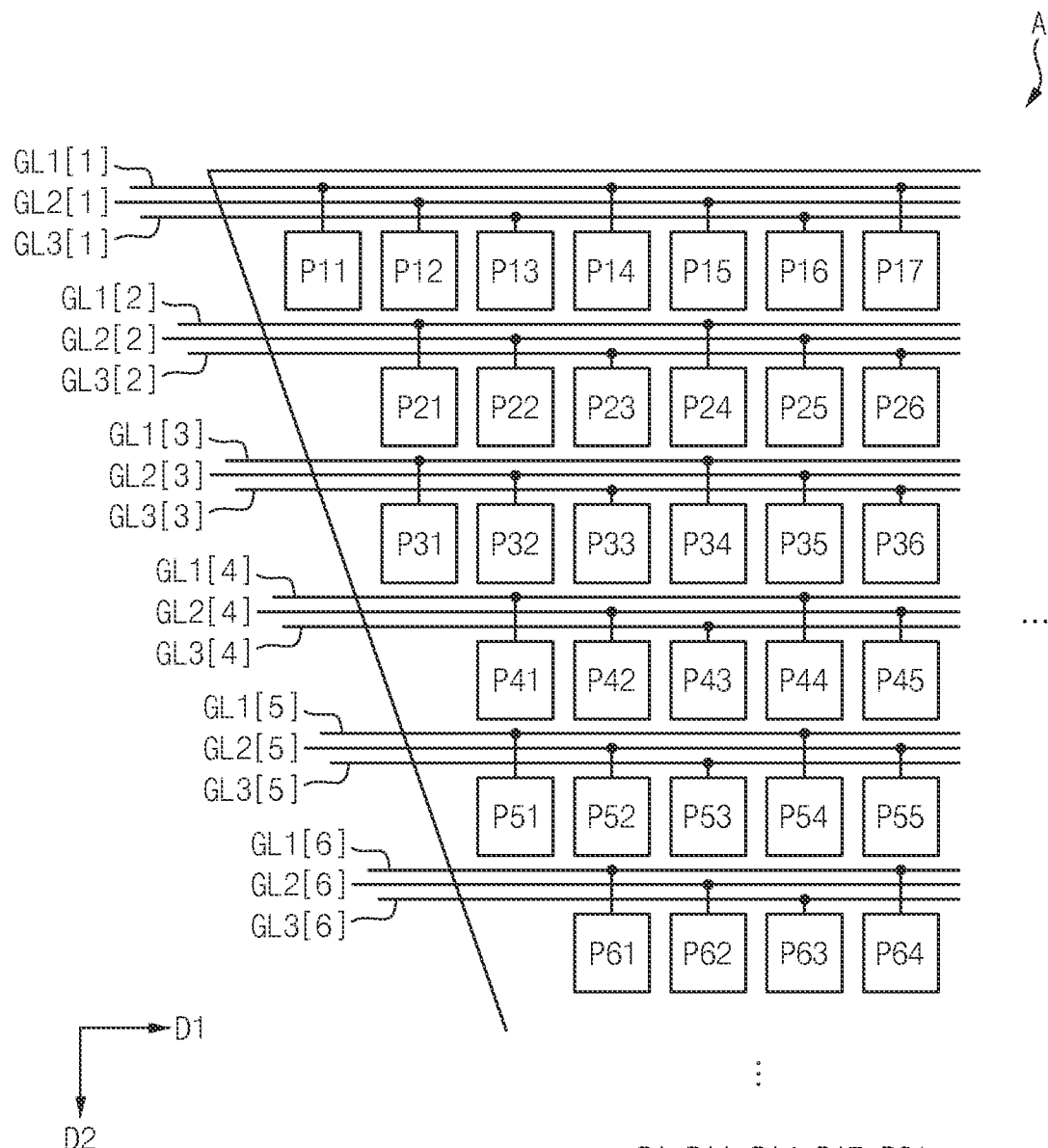
FIG. 12 is a diagram illustrating an example of gate lines in region A of FIG. 2 of the display device of FIG. 11.
Figure 13:
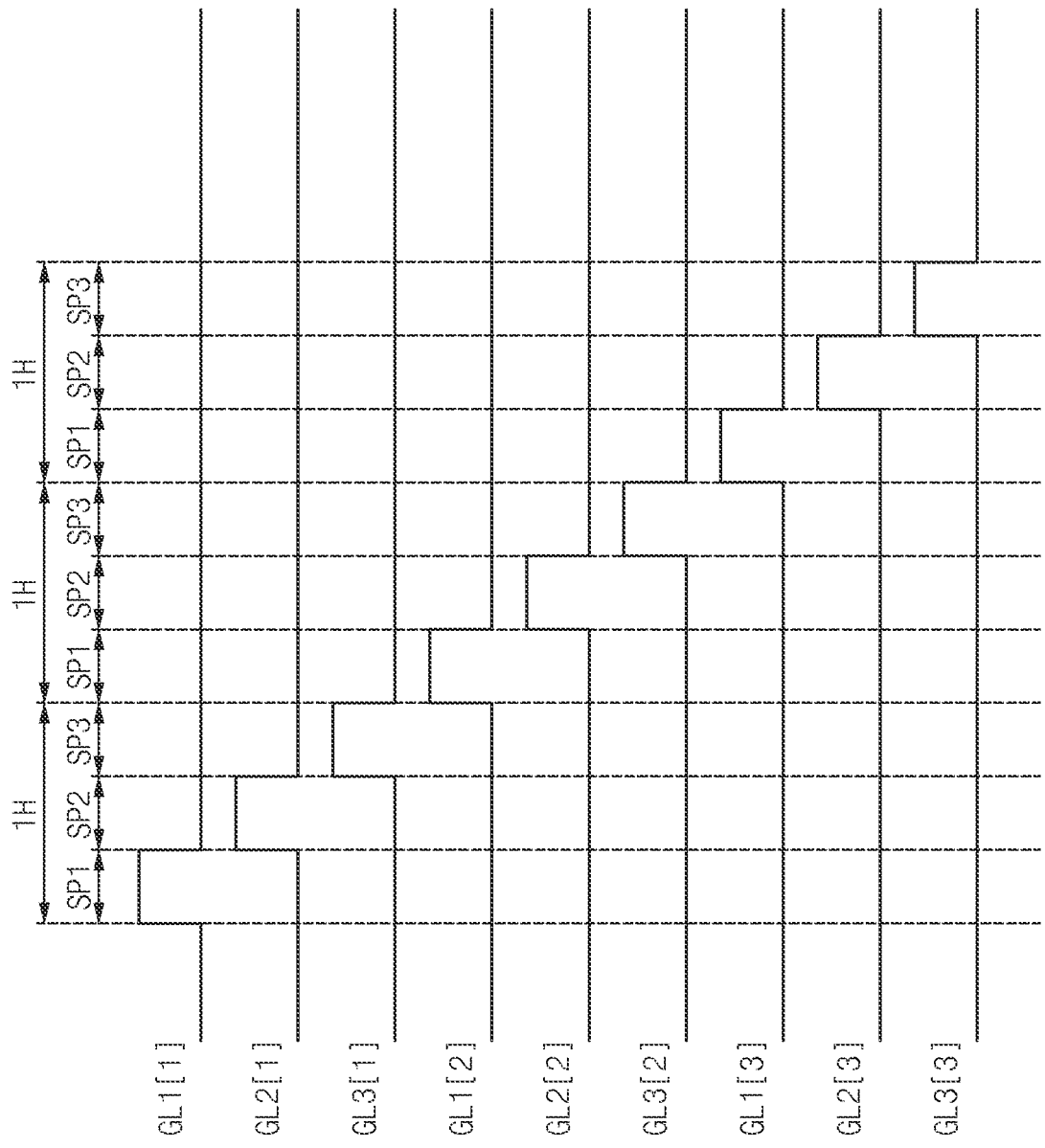
FIG. 13 is a timing diagram illustrating an example of a scan operation of the display device of FIG. 11.

FIG. 11 is a diagram illustrating an example of the first data line DL1 of a display device according to embodiments of the invention, FIG. 12 is a diagram illustrating an example of the gate lines GL in region A of FIG. 2 of the display device of FIG. 11, and FIG. 13 is a timing diagram illustrating an example of the scan operation of the display device of FIG. 11. FIG. 11 does not show a portion where the first data line DL1 is connected to the data driver 400.

FIGS. 11 and 12 show a pixel P in an x row and a y column as Pxy. For example, the pixel P in the first row and the first column is P11, the pixel P in the second row and the first column is P21, and the pixel P in the first row and the second column is P12.

The display device of FIGS. 11 to 13 is substantially the same as the display device of FIGS. 1 to 10 except that N is 3. Thus, the same reference numerals are used to refer to the same or similar elements, and any repetitive detailed description thereof will be omitted.

Referring to FIGS. 1 to 3 and 11, in an embodiment, the display panel 100 may include the first data line DL1 connected to the pixels P of the first display region AA1. The first data line DL1 may be connected to N pixels P among the pixels P of each of the pixel rows.

In an embodiment, for example, as shown in FIG. 11, where N is 3, the first data line DL1 may be connected to a first pixel P1, a second pixel P2, and a third pixel P3 among the pixels P of each of the pixel rows. That is, the first data line DL1 may be connected to the plurality of the pixels P (i.e., the first pixel P1, the second pixel P2, and the third pixel P3) in one pixel row.

For example, as shown in FIG. 4, the first pixel P1 may be P11, P14, P17, P21, P24, P31, P34, P41, P44, P51, P54, P61, and P64, the second pixel P2 may be P12, P14, P22, P25, P32, P35, P42, P45, P52, P55, and P62, and the third pixel P3 may be P13, P16, P23, P26, P33, P36, P43, P53, and P63.

For example, a first of the first data lines DL1 may be connected to P11, P12, and P13 in a first pixel row. For example, the first of the first data lines DL1 may be connected to P21, P22, and P23 in a second pixel row.

For example, a second of the first data lines DL1 may be connected to P14, P15, and P16 in the first pixel row. For example, the second of the first data lines DL1 may be connected to P24, P25, and P26 in the second pixel row.

Referring to FIGS. 1 to 3, 9, 11, and 12, the first data line DL1 may be connected to N pixels P among the pixels P of each of the pixel rows, and the N pixels P may be connected to different gate lines GL, respectively. One of the gate lines (for example, a first gate line (GL1[1], GL1[2], GL1[3], GL1[4], GL1[5], GL1[6]), a second gate line (GL2[1], GL2[2], GL2[3], GL2[4], GL2[5], GL2[6], ... ), and a third gate line (GL3[1], GL3[2], GL3[3], GL3[4], GL3[5], GL3 [6], ... )) connected to the N pixels P may be connected to the pixels P disposed to the second display region AA2.

In an embodiment, for example, as shown in FIG. 11, where N is 3, the first data line DL1 may be connected to the first pixel P1, the second pixel P2, and the third pixel P3 among the pixels P of each of the pixel rows. In such an embodiment, as shown in FIG. 12, the first pixel P1 may be connected to the first gate line (GL1[1], GL1[2], GL1[3], GL1[4], GL1[5], GL1[6], ... ) among the gate lines GL, the second pixel P2 may be connected to the second gate line (GL2[1], GL2[2], GL2[3], GL2[4], GL2[5], GL2[6], ... ) among the gate lines GL, and the third pixel P3 may be connected to the third gate line (GL3[1], GL3[2], GL3[3], GL3[4], GL3[5], GL3[6], ... ) among the gate lines GL. For example, as shown in FIG. 9, the pixels P disposed to the second display region AA2 may be connected to the first gate line (GL1[1], GL1[2], GL1[3], GL1[4], GL1 [5], GL1 [6], ... ).

For example, in the first pixel row, P11, P14, and P17 may be connected to a first GL1[1] among the first gate lines (GL1[1], GL1[2], GL1[3], GL1[4], GL1[5], GL1[6], ... ). For example, in the first pixel row, P150, P151, P152, P153, and P154 may be connected to the first GL1[1] among the first gate lines (GL1[1], GL1[2], GL1[3], GL1[4], GL1[5], GL1[6], ... ). For example, P12 and P15 may be connected to the first GL2[1] among the second gate lines (GL2[1], GL2[2], GL2[3], GL2[4], GL2[5], GL2[6], ... ). For example, P13 and P16 may be connected to the first GL3[1] among the second gate lines (GL3[1], GL3[2], GL3[3], GL3[4], GL3[5], GL3[6], ... ).

For example, in the second pixel row, P21 and P24 may be connected to a second GL1[2] among the first gate lines (GL1[1], GL1[2], GL1[3], GL1[4], GL1[5], GL1[6], ... ). For example, in the second pixel row, P250, P251, P252, P253, and P254 may be connected to the second GL1[2] among the first gate lines (GL1[1], GL1[2], GL1[3], GL1[4], GL1[5], GL1[6], ... ). For example, P22 and P25 may be connected to the second GL2[2] among the second gate lines (GL2[1], GL2[2], GL2[3], GL2[4], GL2[5], GL2[6], ... ). For example, P23 and P26 may be connected to the second GL3[2] among the third gate lines (GL3[1], GL3[2], GL3 [3], GL3[4], GL3[5], GL3[6], ... ).

Referring to FIGS. 1 to 3, 9, and 11 to 13, FIG. 13 shows the scan signals provided to each of the gate lines GL.

A horizontal time 1H of each frame may include a first scan period SP1, a second scan period SP2 following the first scan period SP1, and a third scan period SP3 following the second scan period SP2, the first pixel P1 and the pixels P of the second display region AA2 may be scanned in the first scan period SP1, the second pixel P2 may be scanned in the second scan period SP2, and the third pixel P3 may be scanned in the third scan period P3.

Simultaneous scanning of the first pixel P1, the second pixel P2, and the third pixel P3 connected to one first data line DL1 may be difficult. Accordingly, in an embodiment, the first pixel P1, the second pixel P2, and the third pixel P3 may be connected to different gate lines GL, respectively.

For example, the scan signal may be provided to the first gate line (GL1[1], GL1[2], GL1[3], GL1[4], GL1[5], GL1 [6]) in the first scan period SP1, the scan signal may be provided to the second gate line (GL2[1], GL2[2], GL2[3], GL2[4], GL2[5], GL2[6], ... ) in the second scan period SP2, and the scan signal may be provided to the third gate line (GL3[1], GL3[2], GL3[3], GL3[4], GL3[5], GL3[6], ... ) in the third scan period SP3. For example, the scan signals may be sequentially provided to the first gate lines (GL1[1], GL1[2], GL1[3], GL1[4], GL1[5], GL1[6]) in the first scan period SP1, the scan signals may be sequentially provided to the second gate lines (GL2[1], GL2[2], GL2[3], GL2[4], GL2[5], GL2[6], ... ) in the second scan period SP2, and the scan signals may be sequentially provided to the third gate lines (GL3[1], GL3[2], GL3[3], GL3[4], GL3[5], GL3[6], ... ) in the third scan period SP3.

Accordingly, since the first gate lines (GL1[1], GL1[2], GL1[3], GL1[4], GL1[5], GL1[6], . . . ) may be connected to the first pixels P1 and the pixels P disposed to the second display region AA2, the first pixels P1 and the pixels P disposed to the second display region AA2 may be scanned in the first scan period SP1. For example, since the second gate line (GL2[1], GL2[2], GL2[3], GL2[4], GL2[5], GL2 [6], . . . ) may be connected to the second pixels P2, the second pixels P2 may be scanned in the second scan period SP2. For example, since the third gate line (GL3[1], GL3[2], GL3[3], GL3[4], GL3[5], GL3[6], . . . ) may be connected to the third pixels P3, the third pixels P3 may be scanned in the third scan period SP3.

The first display region AA1 may be scanned with a first scan frequency, and the second display region AA2 may be scanned with a second scan frequency lower than the first scan frequency. In an embodiment, the first scan frequency may be N times the second scan frequency.

In an embodiment, for example, since the pixels P disposed to the first display region AA1 are connected to the first gate lines GL1, the second gate lines GL2, and the third gate lines GL3, the first display region AA1 may be scanned in the first scan period SP1, the second scan period SP2, and the third scan period SP3. In such an embodiment, since the pixels P disposed to the second display region AA2 are connected only to the first gate lines GL1, the second display region AA2 may be scanned in the first scan period SP1. Accordingly, in an embodiment where N is 3, the first scan frequency may be three times the second scan frequency.

Figure 14:
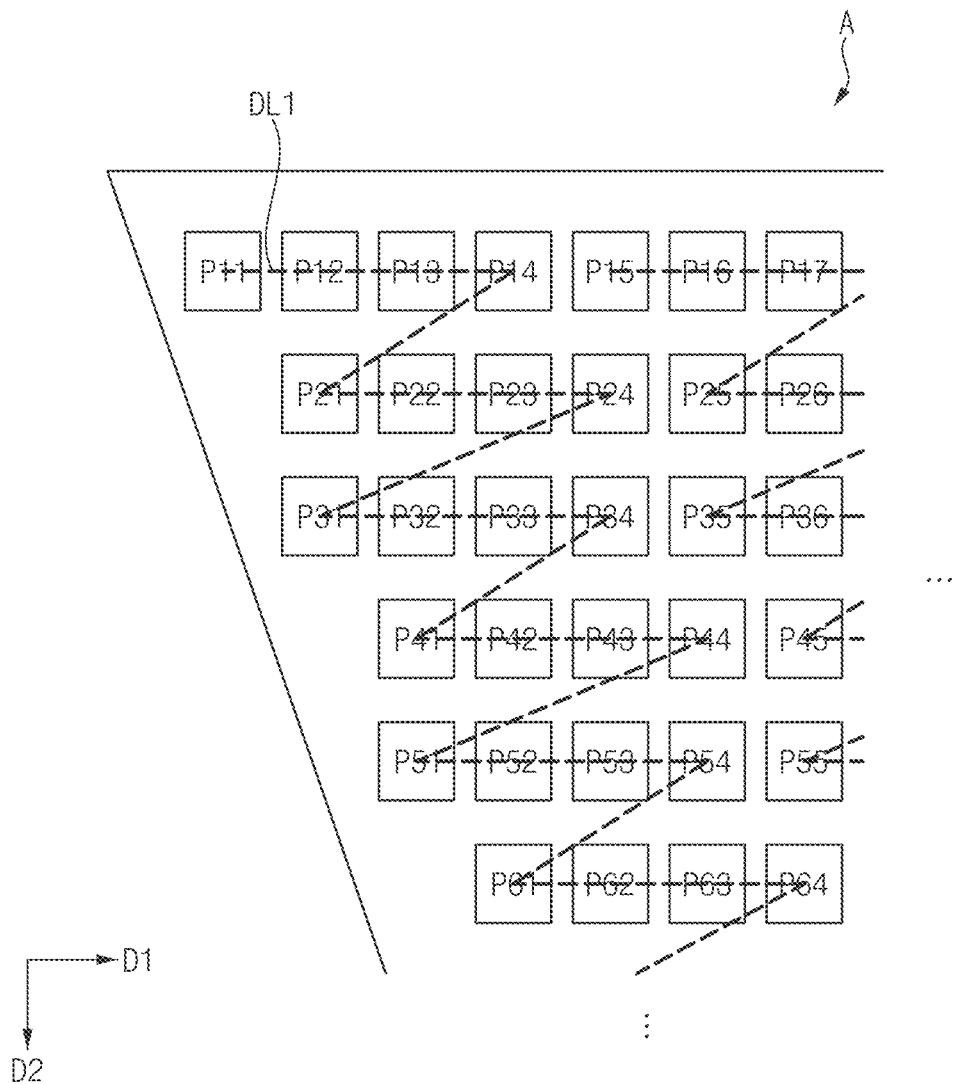
FIG. 14 is a diagram illustrating an example of a first data line of a display device according to embodiments of the invention.
Figure 15:
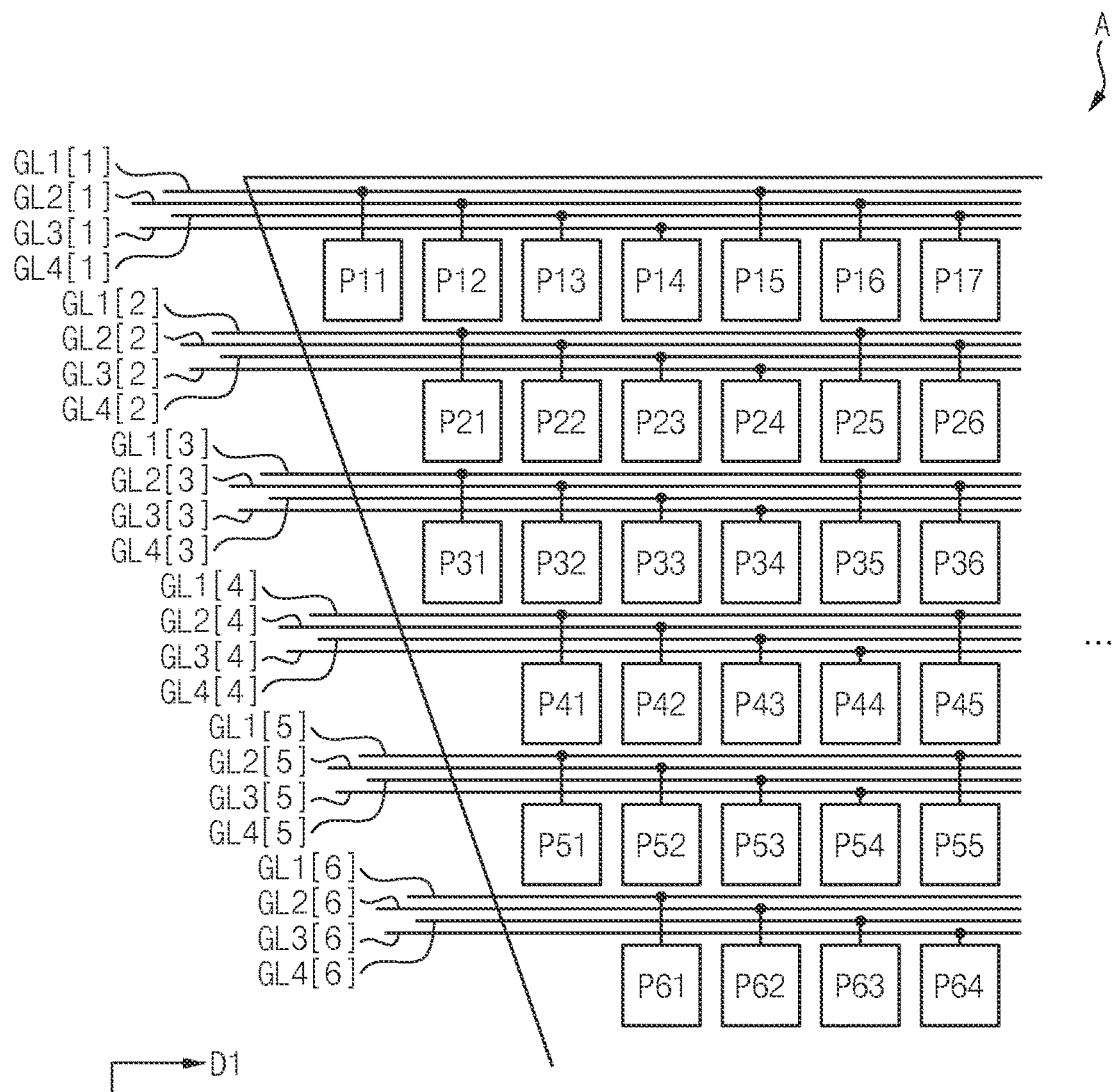
FIG. 15 is a diagram illustrating an example of gate lines in region A of FIG. 2 of the display device of FIG. 14.
Figure 16:
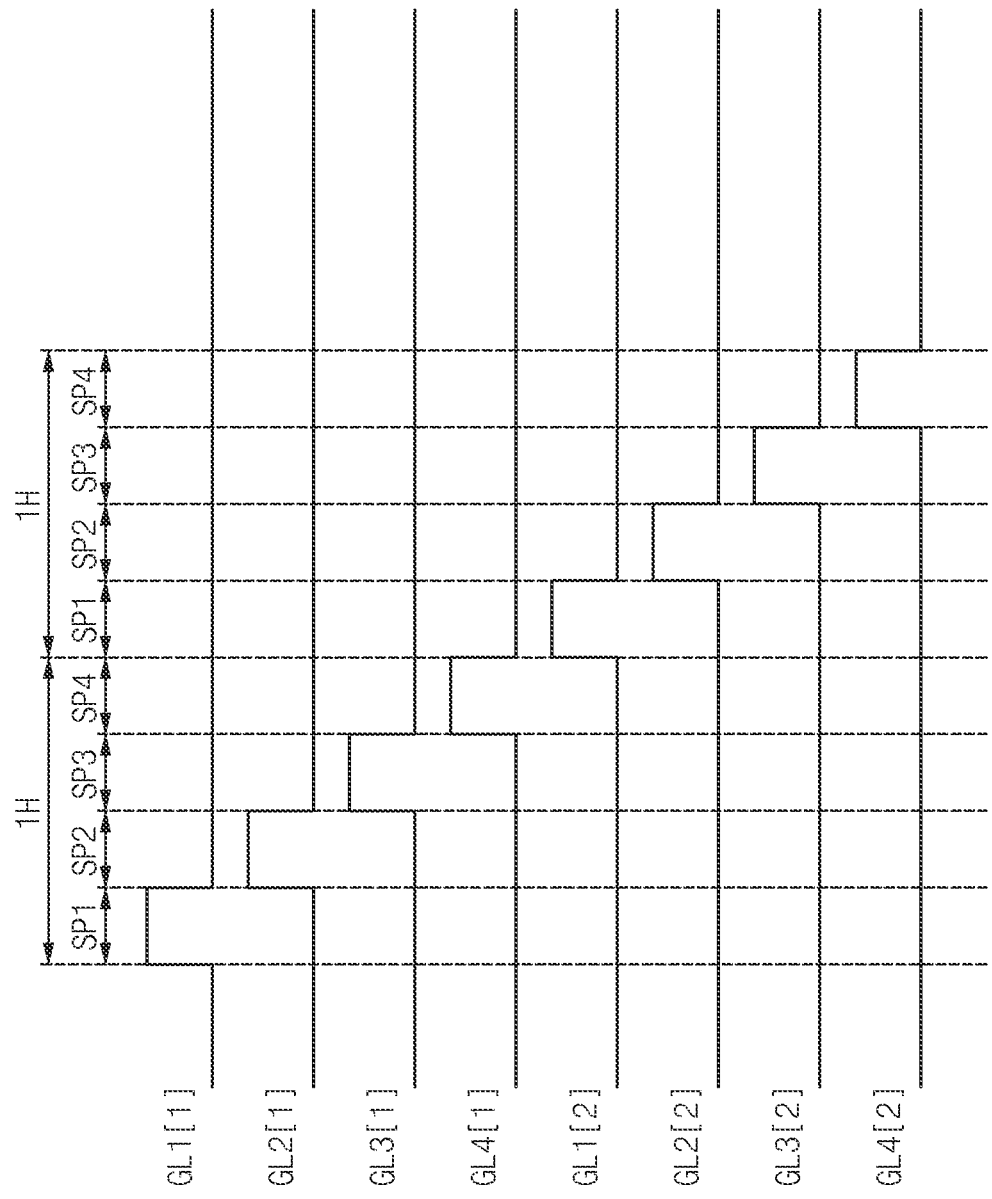
FIG. 16 is a timing diagram illustrating an example of a scan operation of the display device of FIG. 14.

FIG. 14 is a diagram illustrating an example of the first data line DL1 of a display device according to embodiments of the invention, FIG. 15 is a diagram illustrating an example of the gate lines GL in region A of FIG. 2 of the display device of FIG. 14, and FIG. 16 is a timing diagram illustrating an example of the scan operation of the display device of FIG. 14. FIG. 14 does not show a portion where the first data line DL1 is connected to the data driver 400.

FIGS. 14 to 15 show a pixel P in an x row and a y column as Pxy. For example, the pixel P in the first row and the first column is P11, the pixel P in the second row and the first column is P21, and the pixel P in the first row and the second column is P12.

The display device of FIGS. 14 and 15 is substantially the same as the display device of FIGS. 1 to 10 except that N is 4. Thus, the same reference numerals are used to refer to the same or similar elements, and any repetitive detailed description thereof will be omitted.

Referring to FIGS. 1 to 3 and 14, the display panel 100 may include the first data line DL1 connected to the pixels P of the first display region AA1. The first data line DL1 may be connected to N pixels P among the pixels P of each of the pixel rows.

In an embodiment, for example, as shown in FIG. 14, where N is 4, the first data line DL1 may be connected to a first pixel P1, a second pixel P2, a third pixel P3, and a fourth pixel P4 among the pixels P of each of the pixel rows. That is, the first data line DL1 may be connected to the plurality of the pixels P (i.e., the first pixel P1, the second pixel P2, the third pixel P3, and the fourth pixel P4) in one pixel row.

For example, as shown in FIG. 14, the first pixel P1 may be P11, P15, P21, P25, P31, P35, P41, P45, P51, P55, and P61, the second pixel P2 may be P12, P16, P22, P26, P32, P36, P42, P52, and P62, the third pixel P3 may be P13, P17, P23, P43, P53, and P63, and the fourth pixel P4 may be P14, P24, P34, P44, P54, and P64.

For example, a first of the first data lines DL1 may be connected to P11, P12, P13, and P14 in a first pixel row. For example, the first of the first data lines DL1 may be connected to P21, P22, P23, and P24 in a second pixel row.

Referring to FIGS. 1 to 3, 9, 14, and 15, the first data line DL1 may be connected to N pixels P among the pixels P of each of the pixel rows, and the N pixels P may be connected to different gate lines GL, respectively. One of the gate lines (for example, a first gate line (GL1[1], GL1[2], GL1[3], GL1[4], GL1[5], GL1[6], . . . ), a second gate line (GL2[1], GL2[2], GL2[3], GL2[4], GL2[5], GL2[6], . . . ), a third gate line (GL3[1], GL3[2], GL3[3], GL3[4], GL3[5], GL3[6], . . . ), and a fourth gate line (GL4[1], GL4[2], GL4[3], GL4[4], GL4[5], GL4[6], . . . )) connected to the N pixels P may be connected to the pixels P disposed to the second display region AA2.

In an embodiment, for example, as shown in FIG. 14, where N is 4, the first data line DL1 may be connected to the first pixel P1, the second pixel P2, the third pixel P3, and the fourth pixel P4 among the pixels P of each of the pixel rows. For example, as shown in FIG. 15, the first pixel P1 may be connected to the first gate line (GL1[1], GL1[2], GL1[3], GL1[4], GL1[5], GL1[6], . . . ) among the gate lines GL, the second pixel P2 may be connected to the second gate line (GL2[1], GL2[2], GL2[3], GL2[4], GL2[5], GL2[6], . . . ) among the gate lines GL, the third pixel P3 may be connected to the third gate line (GL3[1], GL3[2], GL3[3], GL3[4], GL3[5], GL3[6], . . . ) among the gate lines GL, and the fourth pixel P4 may be connected to the fourth gate line (GL4[1], GL4[2], GL4[3], GL4[4], GL4[5], GL4[6], . . . ) among the gate lines GL. In such an embodiment, as shown in FIG. 9, the pixels P disposed to the second display region AA2 may be connected to the first gate line (GL1[1], GL1[2], GL1[3], GL1[4], GL1[5], GL1[6], . . . ).

For example, in the first pixel row, P11 and P15 may be connected to a first GL1[1] among the first gate lines (GL1[1], GL1[2], GL1[3], GL1[4], GL1[5], GL1[6], . . . ). For example, in the first pixel row, P150, P151, P152, P153, and P154 may be connected to the first GL1[1] among the first gate lines (GL1[1], GL1[2], GL1[3], GL1[4], GL1[5], GL1[6], . . . ). For example, P12 and P16 may be connected to the first GL2[1] among the second gate lines (GL2[1], GL2[2], GL2[3], GL2[4], GL2[5], GL2[6], . . . ). For example, P13 and P17 may be connected to the first GL3[1] among the second gate lines (GL3[1], GL3[2], GL3[3], GL3[4], GL3[5], GL3[6], . . . ). For example, P14 may be connected to the first GL4[1] among the second gate lines (GL4[1], GL4[2], GL4[3], GL4[4], GL4[5], GL4[6], . . . ).

For example, in the second pixel row, P21 and P25 may be connected to a second GL1[2] among the first gate lines (GL1[1], GL1[2], GL1[3], GL1[4], GL1[5], GL1[6], . . . ). For example, in the second pixel row, P250, P251, P252, P253, and P254 may be connected to the second GL1[2] among the first gate lines (GL1[1], GL1[2], GL1[3], GL1[4], GL1[5], GL1[6], . . . ). For example, P22 and P26 may be connected to the second GL2[2] among the second gate lines (GL2[1], GL2[2], GL2[3], GL2[4], GL2[5], GL2[6], . . . ). For example, P23 may be connected to the second GL3[2] among the third gate lines (GL3[1], GL3[2], GL3[3], GL3 [4], GL3[5], GL3[6], . . . ). For example, P24 may be connected to the second GL4[2] among the third gate lines (GL4[1], GL4[2], GL4[3], GL4[4], GL4[5], GL4[6], . . . ).

Referring to FIGS. 1 to 3, 9, and 14 to 16, FIG. 16 shows the scan signals provided to each of the gate lines GL.

A horizontal time 1H of each frame may include a first scan period SP1, a second scan period SP2 following the first scan period SP1, a third scan period SP3 following the second scan period SP2, and a fourth scan period SP4 following the third scan period SP3, the first pixel P1 and the pixels P of the second display region AA2 may be scanned in the first scan period SP1, the second pixel P2 may be scanned in the second scan period SP2, the third pixel P3 may be scanned in the third scan period P3, and the fourth pixel P4 may be scanned in the fourth scan period P4.

Simultaneous scanning of the first pixel P1, the second pixel P2, the third pixel P3, and the fourth pixel P4 connected to one first data line DL1 may be difficult. Accordingly, the first pixel P1, the second pixel P2, the third pixel P3, and the fourth pixel P4 may be connected to different gate lines GL, respectively.

For example, the scan signal may be provided to the first gate line (GL1[1], GL1[2], GL1[3], GL1[4], GL1[5], GL1[6]) in the first scan period SP1, the scan signal may be provided to the second gate line (GL2[1], GL2[2], GL2[3], GL2[4], GL2[5], GL2[6], . . . ) in the second scan period SP2, the scan signal may be provided to the third gate line (GL3[1], GL3[2], GL3[3], GL3[4], GL3[5], GL3[6], . . . ) in the third scan period SP3, and the scan signal may be provided to the fourth gate line (GL4[1], GL4[2], GL4[3], GL4[4], GL4[5], GL4[6], . . . ) in the fourth scan period SP4. For example, the scan signals may be sequentially provided to the first gate lines (GL1[1], GL1[2], GL1[3], GL1[4], GL1[5], GL1[6]) in the first scan period SP1, the scan signals may be sequentially provided to the second gate lines (GL2[1], GL2[2], GL2[3], GL2[4], GL2[5], GL2[6], . . . ) in the second scan period SP2, the scan signals may be sequentially provided to the third gate lines (GL3[1], GL3[2], GL3[3], GL3[4], GL3[5], GL3[6], . . . ) in the third scan period SP3, and the scan signals may be sequentially provided to the fourth gate lines (GL4[1], GL4[2], GL4[3], GL4[4], GL4[5], GL4[6], . . . ) in the fourth scan period SP4.

Accordingly, since the first gate lines (GL1[1], GL1[2], GL1[3], GL1[4], GL1[5], GL1[6], . . . ) may be connected to the first pixels P1 and the pixels P disposed to the second display region AA2, the first pixels P1 and the pixels P disposed to the second display region AA2 may be scanned in the first scan period SP1. For example, since the second gate line (GL2[1], GL2[2], GL2[3], GL2[4], GL2[5], GL2[6], . . . ) may be connected to the second pixels P2, the second pixels P2 may be scanned in the second scan period SP2. For example, since the third gate line (GL3[1], GL3[2], GL3[3], GL3[4], GL3[5], GL3[6], . . . ) may be connected to the third pixels P3, the third pixels P3 may be scanned in the third scan period SP3. For example, since the fourth gate line (GL4[1], GL4[2], GL4[3], GL4[4], GL4[5], GL4[6], . . . ) may be connected to the fourth pixels P4, the fourth pixels P4 may be scanned in the fourth scan period SP4.

The first display region AA1 may be scanned with a first scan frequency, and the second display region AA2 may be scanned with a second scan frequency lower than the first scan frequency. In an embodiment, the first scan frequency may be N times the second scan frequency.

In an embodiment, for example, since the pixels P disposed to the first display region AA1 are connected to the first gate lines GL1, the second gate lines GL2, the third gate lines GL3, and the fourth gate lines GL4, the first display region AA1 may be scanned in the first scan period SP1, the second scan period SP2, the third scan period SP3, and the fourth scan period SP4. in such an embodiment, since the pixels P disposed to the second display region AA2 are connected only to the first gate lines GL1, the second display region AA2 may be scanned in the first scan period SP1. Accordingly, in an embodiment where N is 4, the first scan frequency may be four times the second scan frequency.

Figure 17:
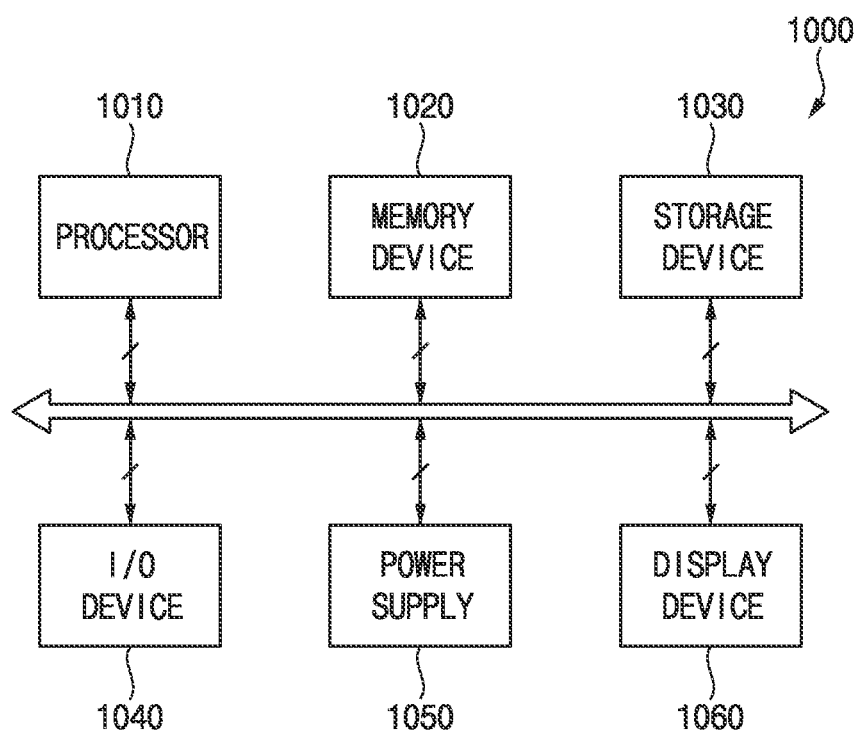
FIG. 17 is a block diagram showing an electronic device according to embodiments of the invention.
Figure 18:
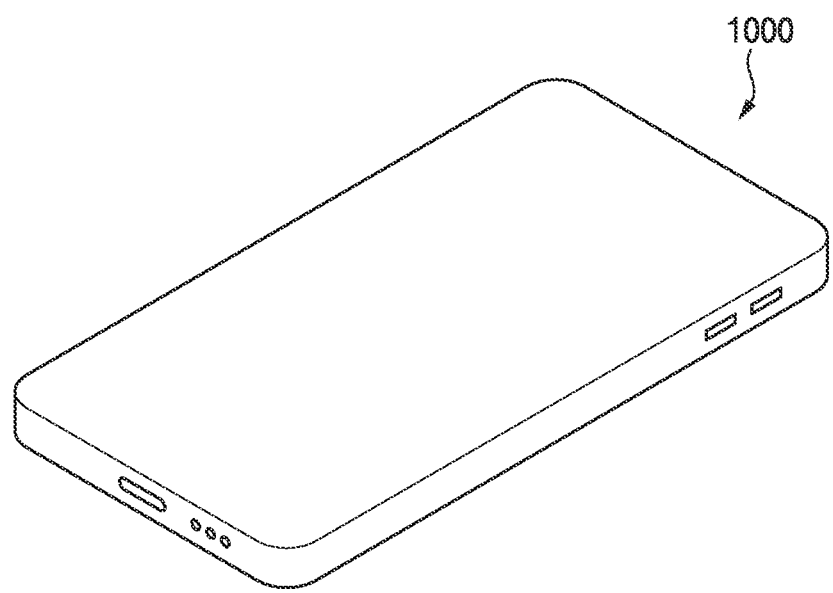
FIG. 18 is a diagram showing an example in which the electronic device of FIG. 17 is implemented as a smart phone.

FIG. 17 is a block diagram showing an electronic device according to embodiments of the invention, and FIG. 18 is a diagram showing an example in which the electronic device of FIG. 17 is implemented as a smart phone.

Referring to FIGS. 17 and 18, an embodiment of the electronic device 1000 may include a processor 1010, a memory device 1020, a storage device 1030, an input/output (I/O) device 1040, a power supply 1050, and a display device 1060. Here, the display device 1060 may be the display device of FIG. 1. In an embodiment, the electronic device 1000 may further include a plurality of ports for communicating with a video card, a sound card, a memory card, a universal serial bus (USB) device, other electronic devices, etc. In an embodiment, as shown in FIG. 18, the electronic device 1000 may be implemented as a smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links. Here, the display device 1060 may reduce the dead space caused by an atypical display region by including the data lines connected to the plurality of the pixels in one pixel row.

Embodiments of the inventions may be applied to any electronic device including the display device. For example, embodiments of the inventions may be applied to a television (TV), a digital TV, a three-dimensional (3D) TV, a mobile phone, a smart phone, a tablet computer, a virtual reality (VR) device, a wearable electronic device, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel of a display device comprising:
 a display region divided into a first display region and a second display region;
 pixels disposed in the display region;
 gate lines each connected to some pixels;
 a first data line connected to some pixels in the first display region; and
 a second data line connected to some pixels in the second display region,
 wherein the first data line is connected to N pixels among the pixels of each of pixel rows in the first display region, wherein N is a positive integer greater than or equal to 2,
 wherein the second data line is connected to all of the pixels in a same pixel column in the second display region,
 wherein the second data line is connected to only one of the pixels in a same pixel row in the second display region, and
 wherein the N pixels in a same row are connected to different gate lines, respectively.

2. The display panel of claim 1, wherein a number of the pixels of each of the pixel rows in the first display region is not constant.

3. The display panel of claim 1, wherein a number of the pixels of each of the pixel rows in the second display region is constant.

4. The display panel of claim 1, wherein at least one gate line selected from the gate lines connected to the N pixels in the same row is connected to at least one pixel disposed in the second display region.

5. The display panel of claim 1, wherein the first display region is scanned with a first scan frequency, and
 wherein the second display region is scanned with a second scan frequency lower than the first scan frequency.

6. The display panel of claim 5, wherein the first scan frequency is N times the second scan frequency.

7. The display panel of claim 1, wherein the N pixels in the same row include a first pixel and a second pixel,
 wherein the first pixel is connected to a first gate line among the different gate lines, and
 wherein the second pixel is connected to a second gate line among the different gate lines.

8. The display panel of claim 7, wherein some pixels disposed in the second display region are connected to the first gate line.

9. The display panel of claim 8, wherein a horizontal time of each frame includes a first scan period and a second scan period following the first scan period,
 wherein the first pixel in the same row and the pixels in the same row in the second display region are scanned in the first scan period, and
 wherein the second pixel in the same row is scanned in the second scan period.

10. A display device comprising:
 a display panel including pixels disposed to a display region;
 a data driver which provides data voltages to a first data line and a second data line connected to the pixels;
 a gate driver which scans signals to gate lines connected to the pixels; and
 a timing controller which controls the data driver and the gate driver,
 wherein the display panel includes:
  the display region divided into a first display region and a second display region;
  the gate lines each connected to some pixels;
  the first data line connected to some pixels in the first display region; and
  the second data line connected to some pixels in the second display region,
 wherein the first data line is connected to N pixels among the pixels of each of pixel rows in the first display region, wherein N is a positive integer greater than or equal to 2,
 wherein the second data line is connected to all of the pixels in a same pixel column in the second display region,
 wherein the second data line is connected to only one of the pixels in a same pixel row in the second display region, and
 wherein the N pixels in a same row are connected to different gate lines, respectively.

11. The display device of claim 10, wherein a number of the pixels of each of the pixel rows in the first display region is not constant.

12. The display device of claim 10, wherein a number of the pixels of each of the pixel rows in the second display region is constant.

13. The display device of claim 10, wherein at least one of the gate lines connected to the N pixels in the same row is connected to the pixels disposed in the second display region.

14. The display device of claim 10, wherein the first display region is scanned with a first scan frequency, and
 wherein the second display region is scanned with a second scan frequency lower than the first scan frequency.

15. The display device of claim 14, wherein the first scan frequency is N times the second scan frequency.

16. The display device of claim 10, wherein the N pixels in the same row include a first pixel and a second pixel,
 wherein the first pixel is connected to a first gate line among the different gate lines, and
 wherein the second pixel is connected to a second gate line among the different gate lines.

17. The display device of claim 16, wherein all of the pixels disposed in the same row in the second display region are connected to the first gate line.

18. The display device of claim 17, wherein a horizontal time of each frame includes a first scan period and a second scan period following the first scan period, wherein the first pixel in the same row and the pixels in the same row in the second display region are scanned in the first scan period, and wherein the second pixel in the same row is scanned in the second scan period.

* * * * *